United States Patent [19]

Kohen

[11] Patent Number: 4,680,543
[45] Date of Patent: Jul. 14, 1987

[54] PICKUP HAVING ENCAPSULATED ELECTRICAL AND MAGNETIC ELEMENTS

[75] Inventor: Isak Kohen, Rillieux la Pape, France

[73] Assignee: Societe A Responsabilite Limitee, L'Electricfil Industrie, France

[21] Appl. No.: 833,323

[22] Filed: Feb. 24, 1986

[30] Foreign Application Priority Data

Feb. 26, 1985 [FR] France ............................... 85 03006

[51] Int. Cl.$^4$ .................. G01P 1/02; G01P 3/488; G01B 7/30; H01F 27/02
[52] U.S. Cl. .................. 324/208; 174/52 PE; 324/173; 336/96
[58] Field of Search ............ 324/173, 174, 207, 208, 324/229–231, 236, 237; 73/661, 861.11; 336/90, 92, 96, 196, 198; 174/52 PE

[56] References Cited

U.S. PATENT DOCUMENTS

| 3,252,024 | 5/1966 | Loudon | 324/174 X |
| 3,710,246 | 1/1973 | Herring | 324/174 X |
| 3,838,372 | 9/1974 | Damijonaitis | |
| 4,595,897 | 6/1986 | Amano et al. | 324/174 X |

FOREIGN PATENT DOCUMENTS

| 1303822 | 8/1962 | France | 324/174 |
| 2252573 | 7/1975 | France | 324/174 |
| 7417973 | 6/1976 | France | |
| 7424859 | 1/1978 | France | |
| 8501112 | 3/1985 | PCT Int'l Appl. | |
| 781363 | 8/1957 | United Kingdom | 324/174 |
| 2027206 | 2/1980 | United Kingdom | 324/208 |
| 2107882 | 5/1983 | United Kingdom | |

Primary Examiner—Gerard R. Strecker
Attorney, Agent, or Firm—Ostrolenk, Faber, Gerb & Soffen

[57] ABSTRACT

An electromagnetic pickup includes an insulating body that mounts a coil of wire surrounding a spool portion at one end of the body. A magnetic element is disposed within an axial passage through the body, including its spool portion. A sleeve-like molded plastic cover surrounds the spool portion and other portions of the body, and an encapsulation occupies the spaces within the cover that are not occupied by the body and elements mounted thereto. One end of the magnetic element extends to one end of the body and abuts the inner surface of the wall that encloses one end of the cover. The other end of the body is provided with a self-centering flange that engages the inner surface of the cover, and the other end of the cover is provided with the flange that is embedded in the encapsulation that also forms a seat external of the cover.

8 Claims, 3 Drawing Figures

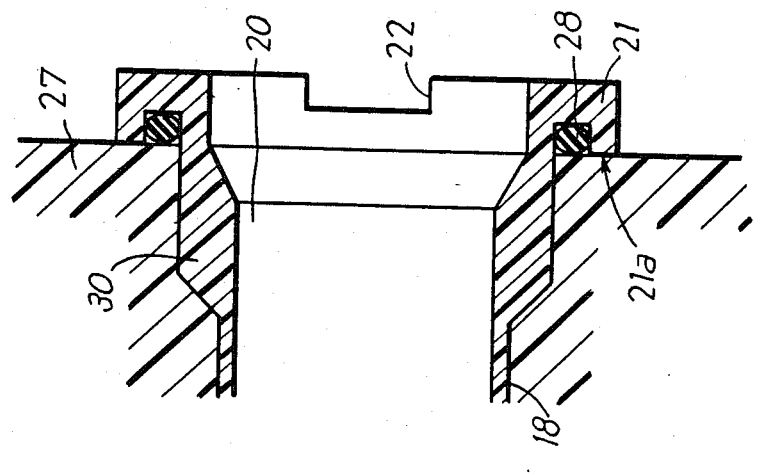
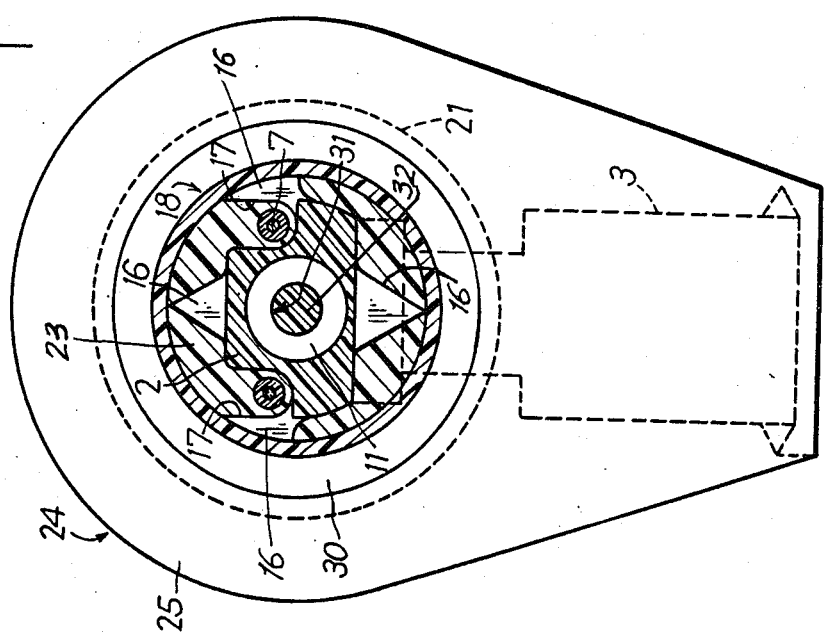

PICKUP HAVING ENCAPSULATED ELECTRICAL AND MAGNETIC ELEMENTS

The present invention relates to electromagnetic type pickups, used for determining the position of a movable piece, generally with respect to a fixed reference, or the moving speed of such a movable piece.

In general, such pickups comprise a body in insulating material containing, inside an axial bore, at least one magnetic element level with one end of the body which forms, concentrically to said element, a bobbin covered with a wound coil connected with two conducting wires. The body is embedded in an external protection in insulating material, protecting the coil and conducting wires against any mechanical, physical or chemical aggressions from the surrounding medium.

In general, such pickups are found to be satisfactory for what they are required to do.

In certain applications, however, it is found that their design raises a problem of reliability. This is particularly the case with pickups intended to be immersed in a fluid medium subjected to variations of temperature and pressure. This is for example the case with pickups included in a velocity rate changing box, working automatically, these pickups being required to measure the speed of the different shafts by being placed in the hydraulic fluid.

In the aforesaid applications, it has been found that the pickups were not tight resulting in leakage of fluid into direct contact with electrical and magnetic elements of the pickups.

A study of this problem has revealed that such leakage was due to a lack of close bonding between the body and the external protection. Besides the pollution aspect of the leakage, there is also the problem of the coil being in contact with the fluid, which for the coil may result in damages through corroding, then making the pickup inoperative or unreliable.

The absence of a close bond between the outer protection and the body, even if both elements are produced from the same material, must it seems, be blamed on the production method. Indeed, when the overmolding is performed, the body does not heat up sufficiently despite all the care taken during the injection. As a result, there is no close bonding between the material of the body and the material of the external protection, and particularly on the front face, with the plane of which the transversal face of the magnetic element of the pickup is level.

One way to solve this problem could have been to mold the external protection over, so as to bring a transversal screen before the front face and close up the peripheral gap between the external protection and the coil, and also cover over the transversal face of the magnetic element.

But this solution comes up against a number of insuperable technical obstacles. Conceivably, the technique used for producing such pickups only enables them to deliver a weak signal. Consequently, for such a proposition not to have a negative bearing on the functioning of the pickup, it is imperative to accurately determine the thickness of the front wall of the protection, in order to define an airgap, while giving to said wall a suitable mechanical strength, particularly under stamping.

By way of example, it may be considered that, for an electromagnetic pickup of conventional use, the thickness of that front wall must be limited to 3/10th of a millimeter.

Considering the overmolding methods used, this operation can only be correctly performed if the body is supported in cantilevered manner inside a mold. On mass production lines, if conventional means are used to achieve such a support, it is virtually impossible to be sure that in every case where variations of temperature pressure occur through the plastic material injection cycle, the frontal end of the body can be positioned with respect to the bottom of the mold in such a way as to leave a gap of 3/10th of a millimeter.

In reality, such variations during the injection cycle will be responsible for the position of the body inside the mold and for thickness variations in the front walls of several pickups in a manufacturing line.

For example, if said thickness is equal to 2/10th of a millimeter instead of 3/10th of a millimeter, this can be considered as a gain for the air gap, but to the detriment of the mechanical strength. If, on the other hand, the thickness of said wall goes up to 4/10th of a millimeter, the mechanical strength is increased, but then the supplied signal suffers a loss which can reach 10% of its value, which is important when producing electromagnetic pickups with high performance/volume ratio.

The uncertainty of results with such a method could lead to pickups with non-reproducible characteristics being obtained and especially pickups of unreliable performance.

It is the object of the present invention to overcome the aforesaid drawback by proposing a new pickup and a method of producing same which give reliable and strong products, able to be mass-produced, with reproducible operational characteristics, and no variable alteration of the signal that they emit, and capable, when mounted, of setting up a completely sealed bond between the outside medium and a fluid volume inside which they are immersed.

These objects are reached according to the invention with a pickup comprising:

(1) a body provided with external self-centering means,
(2) an external protection formed by:
   (a) a tubular sleeve of insulating material closed at one end by a transversal wall and open at its other end which is edged by an anchoring flange, said sleeve being concentrically threaded over the body centering means,
   (b) and by an encapsulation of at least one insulating material filling the gap defined between the body and the sleeve and forming outside the sleeve a support seat covering up the anchoring flange and the part of body projecting from the sleeve.

The invention will be more readily understood on reading the following description with reference th the accompanying drawings in which:

FIG. 2 is a cross-section taken along line II—II of FIG. 1.

FIG. 3 is part of an elevational cross-section of one constituent element of the invention, illustrating a variant embodiment.

Figure 1:
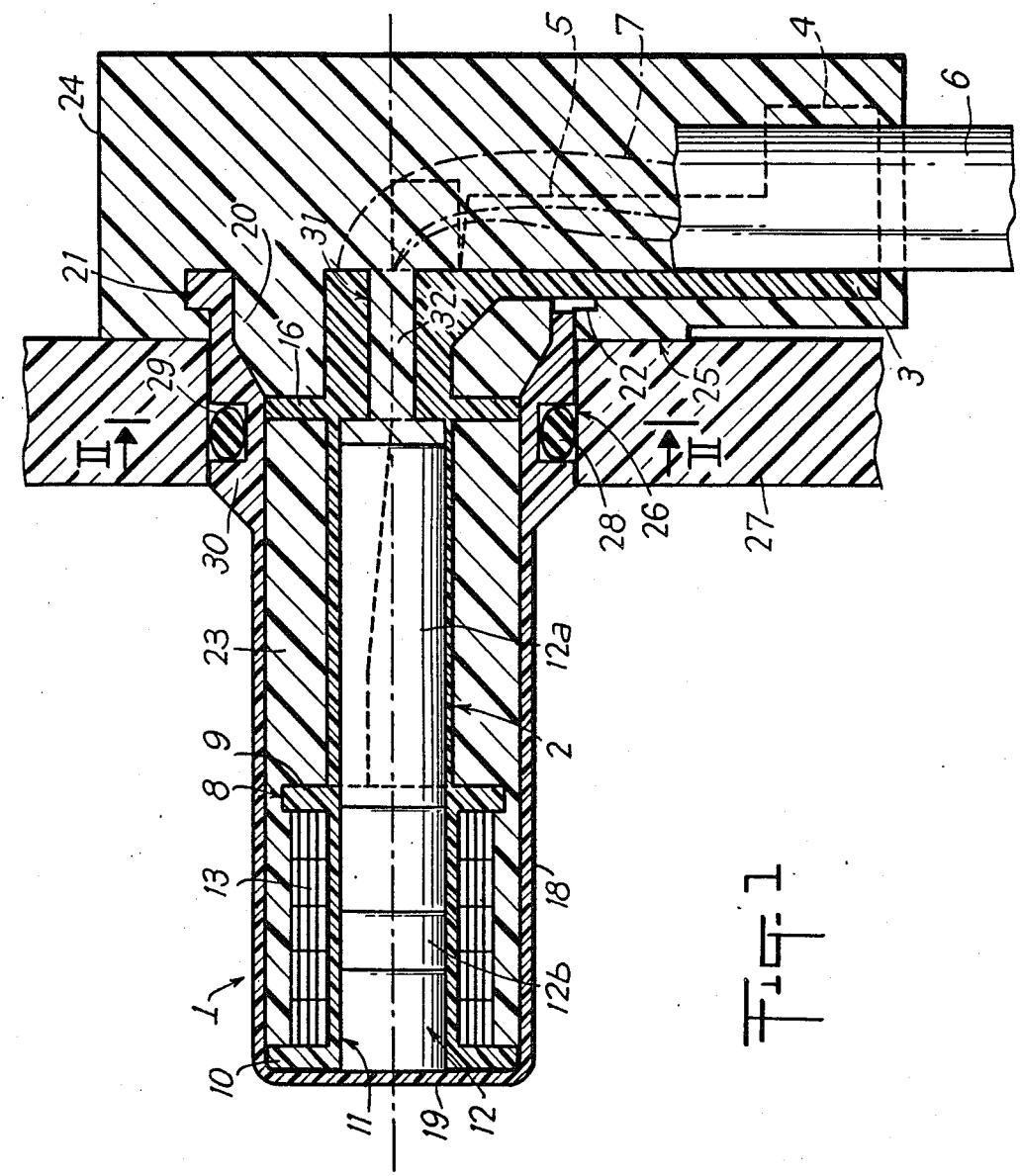
FIG. 1 is an elevational cross-section of the electromagnetic pickup according to the invention.

Referring first to FIGS. 1 and 2, these show that the pickup according to the invention comprises an external protection 1 inside which is encapsulated a body 2 molded of plastic material. The body 2 may be provided, at one of its ends, as illustrated in FIG. 1, with a bar 3 extending perpendicularly to the body 2 with which it forms a monobloc L-shaped piece. The bar 3 comprises a clamp member 4 and, along its longitudinal sides, flanges 5 for holding and guiding a cable 6 composed for example of two conducting wires 7. Although this is not shown, the body 2 may have its own electrical contact means, such as snap contacts. Likewise, the bar 3 could be formed, as an extension of the body 2 instead of perpendicularly to one of its ends.

At end of body 2 remote from the bar 3, said body 2 forms a coil support or spool 8 including flanges 9 and 10 at opposite ends of a core having a circular periphery. Said coil support 8 defines cylindrical housing 11 extending at least partly, axially through the body 2. Disposed within housing 11 is at least one magnetic element 12 preferably formed by a magnetic piece 12a and a pole piece 12b As seen at the left of FIG. 1, the left end of pole piece 12b is aligned with the left or outboard transverse face of the flange 10.

The coil spool 8 supports a winding of enamelled conducting wire 13 formed on the outside of cylindrical core disposed between flanges 9 and 10. The ends of the welding wire 13 are connected to the conducting wires 7 or to the snap contacts.

According to the invention, the body 2 is so designed as to include external self-centering means, formed, on the one hand, by the end flange 10 and on the other hand, by centering protuberances 16 disposed close to the bar 3. Protuberances 16 define two notches 17 made in the periphery in two substantially parallel directions, to allow the engagement or passage of conducting wires 7 or snap contacts connected to the winding 13.

According to the invention, the external protection 1 comprises a cylindrical tubular sleeve 18 of insulating material, preferably produced by molding the same insulating material as that constituting the body 2. Said sleeve 18 has one end closed by a transversal wall 19, of small but constant thickness. Said wall 19, also molded, may be produced in such a way that it has an accurately controlled thickness, which is reproducible if the sleeve 18 is mass-produced. At its end remote from transverse wall 19, the sleeve 18 comprises one open end 20 bordered by an anchoring flange 21 which may be formed by a peripheral ring, of constant cross-section or comprising asperities or recesses. FIG. 1 shows that the anchoring flange 21 may also comprise a notch 22 for engagement of the corresponding part of bar 3.

The sleeve 18 is threaded over the body 2 for cooperating with flange 10 and flange 16, so as to occupy a position accurately centered on the body 2 which is immobilized angularly due to the cooperation of bar 3 with notch 22. The engagement is effected in such a way that the inner face of the front wall 19 of the sleeve contacts with the external transversal face of the flange 10 thus determining a position of engagement in axial abutment.

Assembly is carried out after complete fitting of the body 2 and electric connection between the winding 13 and conducting wires 7 or snap contacts.

The resulting assembly then undergoes an encapsulating treatment with at least one insulating material, preferably the same material as used for the body 2 and sleeve 18. The encapsulation 23 is produced so as to entirely fill the gap between the internal peripheral face of the sleeve 18 and the body 2, and the spaces between protuberances 16 define passages which ensure good progression of the encapsulating material and prevent the creation of zones of poor or no circulation which could leave empty spaces.

The encapsulation 23 is produced by any suitable method, in such a way as to form a support seat 24 confining the anchoring flange 21, the bar 3 as well as the cable 6 and the conducting wires, or the base of the snap contacts. Said support seat is so produced as to comprise a plane contact face 25 bordering the sleeve 18.

The encapsulation 23 and seat 24, which may be also formed in one piece, confer a pseudo monobloc nature to the different elements constituting the electromagnetic pickup.

As illustrated in FIG. 1, the resulting pickup may be engaged through a hole 26 provided in a wall 27, such as for example a velocity rate changing box, working automatically. With the construction according to the invention such as illustrated in FIG. 1, it is found that the active part of the pickup which is immersed in the fluid comprises no interface liable to create a leakage path for the fluid and that the interface which exists between some of the constituting elements is only that resulting from the molding of the support seat 24 on the flange 21. But said interface is then situated externally to the fluid and can be suitably insulated by a joint 28 such as, for example an O-ring.

Said O-ring 28 may be mounted in a groove 29 provided in a collar 30 formed at the periphery of the sleeve 18. FIG. 3 shows that the groove 29 may also be provided in the flange 21, which comprises to this effect a portion 21a projecting towards the front face 19. In such a case, the joint 28 then cooperates with the outer support face of the wall 27 and no longer with the surface 26 of engagement of the pickup.

To obtain a full support of the magnetic element 12 against the transversal wall 19 and thus take full advantage of the accuracy of thickness achieved for the latter, while limiting the operational air gap to a known value, the method according to the invention proposes to connect the housing 11 with a hole 31 axially defined in the body 2 and issuing at the opposite side of flange 10. Said hole 31 is provided so that, during injection of the material for the encapsulation 23 and for the seat 24, said material, being directed through said hole, applies the injection pressure on the corresponding face of element 12, thus forcing the latter to slide axially inside the housing 11 and in doing so applying its end face against the inner face of front wall 19. Hole 31 may be combined with the formation of a housing 11, longer than element 12, so that, after the axial displacement of the latter under the effect of the pressure injecting the encapsulating material, said material forms a shouldered core 32 occupying the hole 31 and part of the housing 11, and opposing any subsequent risk of axial retraction movement of the magnetic element 12.

What is claimed is:

1. An electromagnetic pickup including:
an insulating body, a protective cover wherein said body is disposed, a magnetic element disposed within an axial passage in a spool portion of said body disposed at one end thereof, a pickup winding supported by said spool portion and wound thereabout, first and second conducting wires connected to said winding and extending axially along said body and beyond its other end, a plastic encapsulation disposed within said cover with said body and elements mounted thereon being embedded within said encapsulation;
said body including external self-centering means extending from said body transverse to the axis thereof for radially positioning said body within said cover;

said cover comprising an insulating tubular sleeve closed at one end by a transverse wall and being open at its other end, said cover including an anchoring flange at said other end;

said self-centering means being disposed within said sleeve in engagement with its internal surface;

said encapsulation also extending outside of said sleeve and forming a support seat covering said anchoring flange and a portion of said body that extends outside of said sleeve through the open other end thereof, with said wires extending through said seat and emerging therefrom at a location remote from said one end of said body.

2. Electromagnetic pickup as claimed in claim 1, wherein the internal surface of the transverse wall contacts a transverse end wall of the magnetic element.

3. Electromagnetic pickup as claimed in claim 1, wherein the sleeve defines a groove formed peripherally in that part of the sleeve situated close to the support seat.

4. Electromagnetic pickup as claimed in claim 3, wherein the seat includes a supporting face and the groove is provided in the same plane as the supporting face of the seat.

5. Electromagnetic pickup as claimed in claim 1, wherein the body defines an axial bore which includes said axial passage and extends to that part of the body directed towards the seat, with the seat including a projection that extends into said axial bore at its end remote from said one end of said body.

6. Electromagnetic pickup as claimed in claim 5, wherein the projection includes a shouldered core portion disposed within said axial bore.

7. Electromagnetic pickup as claimed in claim 1, wherein there is a bar formed integrally with the body, said bar extending perpendicularly to the axis of said body and being disposed at the other end of said body.

8. Electromagnetic pickup as claimed in claim 1, wherein there is a bar formed integrally with the body and extending from the other end of said body.

* * * * *